United States Patent [19]

Sperry et al.

[11] 4,243,430

[45] Jan. 6, 1981

[54] PIGMENT DISPERSANT FOR AQUEOUS PAINTS

[75] Inventors: Peter R. Sperry, Doylestown; Richard J. Wiersema, North Wales, both of Pa.

[73] Assignee: Rohm and Haas Company, Philadelphia, Pa.

[21] Appl. No.: 835,262

[22] Filed: Sep. 21, 1977

[51] Int. Cl.$^3$ .............................................. C08L 33/10
[52] U.S. Cl. ........................... 106/308 M; 106/308 Q; 106/309; 260/29.6 WB; 260/29.6 H; 260/29.6 M; 260/42.21
[58] Field of Search ...................... 106/308 M, 308 Q; 526/317; 260/29.6 RB, 29.6 RW, 29.6 WB, 29.6 H, 29.6 M, 42.21

[56] References Cited

U.S. PATENT DOCUMENTS

| | | | |
|---|---|---|---|
| 2,244,703 | 6/1941 | Hubbach | 260/84 |
| 3,026,281 | 3/1962 | Harren et al. | 260/29.6 |
| 3,223,751 | 12/1965 | Sellet | 260/885 |
| 3,840,487 | 10/1974 | Dyson et al. | 260/29.6 H |
| 3,980,602 | 9/1976 | Jakubauskas | 106/308 Q |
| 4,058,499 | 11/1977 | Sekmakas et al. | 260/29.6 RW |
| 4,104,229 | 8/1978 | Sekmakas et al. | 260/29.6 RW |
| 4,110,292 | 8/1978 | Sekmakas et al. | 260/29.6 RW |
| 4,120,841 | 10/1978 | Takahashi et al. | 260/29.6 H |

FOREIGN PATENT DOCUMENTS

| | | |
|---|---|---|
| 655884 | 1/1963 | Canada. |
| 532308 | 1/1941 | United Kingdom. |
| 985276 | 3/1965 | United Kingdom. |
| 998380 | 7/1965 | United Kingdom. |
| 1107249 | 3/1968 | United Kingdom. |

*Primary Examiner*—Jacqueline V. Howard
*Attorney, Agent, or Firm*—Harold L. Greenwald

[57] ABSTRACT

Described herein is a pigment paste for use in an aqueous paint comprising a film-forming latex polymer, a pigment and a dispersant copolymer. Also described is the dispersant copolymer which serves the function of dispersing the pigment in the preparation of the paste and maintaining the dispersion in the paste and paint made therefrom. The dispersant copolymer is such that its complex salt formed with $Zn++$ and ammonia is water-soluble at a pH of 9.6. The dispersant is a copolymer of an $\alpha,\beta$-unsaturated monovinylidene carboxylic acid and at least one other ethylenically unsaturated monomer. The dispersant is particularly adapted to preparing paste for difficult-to-formulate paints such as paints with reactive pigments and paints requiring high levels of dispersant.

14 Claims, No Drawings

PIGMENT DISPERSANT FOR AQUEOUS PAINTS

BACKGROUND OF THE INVENTION

This invention concerns the improvement of pigment pastes, for use in aqueous coating compositions containing a film-forming latex polymer and a pigment, by incorporating into the paste a novel dispersant polymer of great versatility. The dispersant polymer is an effective dispersant for a wide range of pigments and useful in making a pigment paste therefrom; it is also an effective dispersant for the pigment in the presence of the other components of many coating compositions. For example, the dispersant does not appreciably affect the corrosion-resistance properties of a reactive pigment paint in which it is incorporated.

The use of low molecular weight polyelectrolytes as dispersing agents for pigments in water based coatings is known. U.S. Pat. No. 3,980,602 discloses dispersants containing 5to 25% by weight of acrylic or methacrylic acid in polymers based on alkyl acrylates and certain alkyl methacrylates; styrene may be substituted for the latter. These polymers having weight average molecular weights in the range 500 to 30,000. Dispersants based on copolymers of olefins and maleic ahydride are disclosed in U.S. Pat. No. 2,930,775. Formulations containing these dispersants may often exhibit poor stability in the presence of divalent cations. U.S. Pat. No. 3,840,487 discloses acrylic polymer dispersants for high gloss paints the dispersants being composed of 40 to 95 mole percent unsaturated monocarboxylic acid, such as acrylic or methacrylic acid, and 5 to 60 mole percent unsaturated carboxylic acid esters, such as the esters of these acids. Average molecular weights below 75,000 are mentioned. British Pat. No. 985,276 discloses a pigment dispersant comprising acrylic acid, methacrylic acid, an ester of methacrylic acid and a monohydric alcohol and an ester of methacrylic acid and a polyhydric alcohol. The polymerization are in a aqueous medium and produce an emulsion copolymer. Canadian Pat. No. 655,884 discloses dispersants which are copolymers of methacrylic acid and esters of acrylic and methacrylic acids made by a process employing high levels of persulfate initiators such that sulfate groups, believed to be terminal on the polymer chain, are responsible for the enhanced dispersing activity recited for the polymers.

A pigment paste is a pigment concentrate made to permit substantial reduction with solvents, water or vehicle (paint components other than solid pigment) in the preparation of a paint. The pigment paste, also known as pigment dispersion, comprises pigment, dispersant, defoamer, water and/or a glycol and is used to formulate a latex paint. One common way of making latex paints is to charge the paste components to a dispersion mill in which the pigment is dispersed in the aqueous or glycol system and then "letdown" with the remainder of the paint constituents, normally comprising latex, thickener, water, and other specialized additives, often in the small mill running at lower speeds.

Pigments are normally supplied in the fine particle size necessary for use to form thin coating films. For use in paint, the particles must be thoroughly wetted and pigment agglomerates broken up in a high-speed disperser, sand mill or other dispersing equipment. Once a good pigment dispersion is obtained, it must be maintained through the process of paint manufacture and storage. The role of the dispersant is to aid in the dispersion of pigment and thus to develop the full value of hiding and color to be contributed by the pigment. The dispersant also aids in fluidizing the pigment slurry for ease of milling, increases the stability of the pigment suspension in water or glycol, or a mixture thereof, and finally the stability of the completed paint. In considering dispersants and pigment pastes made therefrom, many paint formulations present few difficulties, but if a dispersant is to be effective in a wide range of formulations it must perform well when used in the difficult-to-formulate paint systems. Often the performance of a dispersant and the pigment paste made therefrom is limited by there being a comparatively low top limit to the amount of dispersant which may be used without producing deleterious effects. Another factor which limits utility of many dispersants is incompatibility with the so-called reactive pigments, particularly those used in corrosion inhibiting paint formulations. Thus, such a paint formulation serves as an excellent screening system to demonstrate the versatility of dispersants for use in pigment pastes. The dispersant of the instant invention permits the formulation of pigment pastes containing reactive and corrosion inhibiting pigments which may be used to prepare paints very stable in the wet state and which deposit films imparting a high degree of corrosion resistance when dry. The dispersant of the instant invention permits the corrosion resistant property to be maintained even when used at high concentration in the paste. Thus, pastes made with the dispersant of this invention can be used to make paints which achieve a balance of high stability and high corrosion resistance as well as the many other desiderata of high quality paints.

SUMMARY OF THE INVENTION

The pigment paste of this invention is adapted for use in a wide variety of aqueous latex paints, particularly difficult-to-formulate paints, such as paints containing reactive pigments, e.g., ZnO. The paste comprises a water compatible suspension of a finely divided pigment and, for dispersion of the pigment, an effective amount of the water soluble dispersant comprising the novel copolymer of this invention. The suspension medium is water or a water soluble compound such as an alcohol or a glycol. The dispersant polymer comprises a water soluble or base soluble addition copolymer of greater than about 30% by weight of an $\alpha,\beta$-unsaturated monovinylidene carboxylic acid and at least one other ethylenically unsaturated monomer. The copolymer has an average acid strength such that its apparent pKa lies between about 6.0 to 7.5. The copolymer is low in molecular weight, having a number average molecular weight between about 500 and about 15,000. The copolymer is further characterized by the fact that the salt formed when in combination with the zinc ammonia complex ion, $Zn(NH_3)_4^{++}$, is soluble in an aqueous system at a pH of 9.6.

DETAILED DESCRIPTION

The most important ingredients of the pigment paste are the pigment itself, the dispersant and the medium. Typical pigments (primary pigments and extender pigments) are titanium dioxide and other titanium pigments, white lead, barium sulfate, calcium carbonate, lithopone, silica, talc, mica, clays, iron oxide, carbon black, cadmium sulfide, toluidene red, chrome orange, chrome yellow, chrome green and the so-called reactive pigments which include multivalent metal compounds, such as lead silico-chromate, zinc chromate, calcium zinc molybdate, barium metaborate, zinc oxide, and zinc sulfide. Other reactive and unreactive pigments are well known in the art. Preferred are those pastes comprising titanium dioxide and, for pastes containing reactive pigment, the reactive pigment zinc oxide.

The pastes are fluid pastes of high solids content and low medium content, usually an aqueous medium comprising water or water and minor or major proportion of an alkylene glycl such as ethylene glycol, propylene glycol, which is preferred, or hexylene glycol. The glycols function to slow the drying rate of a paint made from the paste and thus to increase wet-edge time and to improve levelling. The glycol may also have served as the medium during the polymerization of the monomers to form the copolymer of the dispersant. Dissolved in the medium may be a number of other components as discussed hereinbelow.

The dispersant comprises an addition copolymer, water soluble in alkaline aqueous medium, of over about 30% by weight of an $\alpha,\beta$-unsaturated monovinylidene carboxylic acid. As polymerizable $\alpha,\beta$-unsaturated monovinylidene carboxylic acids, there are used acrylic acid, methacrylic acid, or other $\alpha$-substituted polymerizable acrylic acid, or itaconic acid. The preferred acids are methacrylic and then acrylic. In place of the free acids there may be used water-soluble salts thereof, including the ammonium salts and the alkali metal salts such as lithium or potassium carboxylates. The salts may be preformed or they may be formed in the dispersion system. The necessary and important consideration is that carboxylate groups be supplied to enter into the copolymer. The best way to ensure that carboxylate groups do in fact enter into the copolymer chain is to use a free acid monomer.

The other ethylenically unsaturated monomers employed in the copolymer are preferably mono-ethylenically unsaturated, thus the copolymers are preferably linear addition polymers. The most important of the monomers are the acrylic acid and methacrylic acid esters of an alcohol having 1 to 18 carbon atoms with 1 to 8 carbon atom alkyl methacrylates being preferred. Examples of the acrylates and methacrylates are methyl acrylate, ethyl acrylate, butyl acrylates, 2-ethylhexyl acrylate, methyl methacrylate, ethyl methacrylate, propyl methacrylates, and butyl methacrylates, which are preferred. Other ethylenically unsaturated monomers include the vinyl esters of an aliphatic acid, having 1 to 18 carbon atoms, such as vinyl formate, vinyl proprionate, and especially vinyl acetate and vinyl butyrate, mono-unsaturated hydrocarbons such as ethylene, propylene, isobutylene, styrene, chloroprene, $\alpha$-methylstyrene, and other substituted styrenes, vinyl chloride, vinylidene chloride, vinyl toluene, acrylonitrile, methacrylonitrile, acrylamide, methacrylamide, vinyl ethers such as methyl vinyl ether, ethyl vinyl ether, vinyl 2-methoxy-ethyl ether, vinyl 2-chloroethyl ether and the like. The preferred monomers are styrene, acrylonitrile, vinyl acetate and especially the acrylate and methacrylate esters of aliphatic, cyclo-aliphatic or aromatic alcohols containing from 1 to 18 carbon atoms. These alcohols may also contain atoms other than carbon and hydrogen such as oxygen, sulphur, nitrogen, etc., as part of other functional groups such as ethers, alcohols, amides and the like. It is preferred that at least 30% by weight of the copolymer be a hydrocarbon monomer, a $C_1$–$C_{18}$ ester of acrylic acid or of methacrylic acid, or a mixture of these. A more preferred composition has 50% to 70% by weight of $C_1$–$C_8$ alkyl acrylate and/or methacrylate units in the copolymer. A still more highly preferred composition contains 60% to 65% by weight of the $C_2$–$C_4$ alkyl acrylate and/or methacrylate units. The most preferred units are propyl and butyl methacrylate and acrylate units. In general, it is preferred that at least half of the ethylenically unsaturated monomers other than the acid monomers in the copolymer be methacrylate or acrylate esters.

The dispersant copolymer is a copolymer of greater than about 30% by weight of the $\alpha,\beta$-unsaturated monovinylidene, carboxylic acid, and is desirably not over 70% by weight of such acid. Preferably, the copolymer has 30% to 50% by weight of acid mer units with 35% to 40% being most preferred. The preferred acids are acrylic acid, methacrylic acid and itaconic acid, with methacrylic acid being the most preferred. The water soluble copolymer of the dispersant is soluble in neutral water or in basic aqueous solutions. The copolymer also consists of mer units of at least one other ethylenically unsaturated monomer. In most formulations the dispersant polymer is in water solution as the alkali metal (for example, sodium or potassium) ammonium, amine (for example, triethylamine, dimethylamino-ethanol, 2-amino-2-methyl-1-propanol, triethanolamine, pyridine, morpholine) or the like, salt of the copolymer. The number average molecular weight of the copolymer is in the range of about 500 to about 15,000, preferably between 1,000 and 6,000, and most preferbly between 2,000 and 4,000. The number average molecular weight is determined by osmometric methods well known in the art.

The copolymer has an apparent pKa between about 6.0 and about 7.5, preferably between 6.3 and 7.2, and most preferably between 6.5 and 7.0. The values are referred to as "apparent pKa" because unlike the base titration of simple acids in aqueous solution, where the pKa is comparatively independent of the fraction of the molecules neutralized, in the case of polymers the pKa often shows a marked dependence on the fraction neutralized. In this specification the "apparent pKa" refers to the pKa at half neutralization; this is essentially the same as the pH of the solution containing the half neutralized copolymer. The data are obtained by titration of the polymer in the acid form, using dilute base as the titrant, as is customary in acid-base titrations. Typical is the use of an automatic titrator such as the Radiometer Titrograph model SBR2C, using a 5 milliliter burette containing 0.50 M sodium hydroxide, set up to span the entire range from a pH of between 1 to 2 to a pH between 11 and 12 in about 8 minutes. In a typical determination, about 2 milliequivalents of the polymer are dissolved in 75 milliliters of 0.1 M sodium cloride solution. This polymer solution is acidified with a slight excess of 0.5 M hydrochloric acid and then back-titrated with 0.5 M sodium hydroxide. When the acid mer units in the polymer are mono-basic two vertical inflections appear in the titration curve produced by the instrument. The first inflection is the completion of titration of the strong acid, such as the added hydrochloric acid, present in the solution. The second vertical inflection represents the complete neutralization of the acid groups in the polymer. The apparent pKa is the pH of the solution midway (in titrant) between these inflections. In the case of a dibasic mer unit, in the polymer, a third vertical inflection may be observed, as is observed in the titration of many simple dibasic acids, and two apparent pKa values may be assigned.

The dispersant polymer sample for titration is to be free of ammonia and amines; alternatively the titration curve is corrected for the presence of ammonia or amines using the technique common to the field of acid-based titration in analytical chemistry. One procedure is to remove the volatile base by adding excess sodium hydroxide and warming the solution while sparging with carbon dioxide-free nitrogen. A second procedure is to recognize the end point due to the amine or ammonia (using the known pKa of the amine or ammonia) and by yhe usual calculations correct for its presence.

An important characteristic of the copolymer is that it forms a water soluble salt with a zinc ammonia complex ion at a pH of 9.6. The pH for this determination is chosen to be toward the upper end of the pH values of a variety of aqueous latex paints. Thus, a dispersant having a zinc ammonia complex salt which is soluble in the aqueous medium under these conditions will not have a tendency to precipitate or induce the pecipitation or flocculation of other paint ingredients. This property permits a pigment paste employing the dispersant of this invention to be used in a wide variety of aqueous latex paint formulations. Zinc in this instance is typical of the multivalent metal ions which may be added as soluble salts or may be produced when reactive pigments are formulated in paints containing high levels of ammonia or amines. Many of the polymer dispersants of the prior art exhibit limited solubility under these conditions and, thus, cannot be used in this pH region and with the pigments which will result in insoluble salts of the dispersant. Examples of such prior art dispersants are given below where it is seen that storage of 250 hours at a moderately elevated temperature produces marked increase in viscosity of a paint formulated with these prior art materials. It is one of the advantages of the dispersant polymer of this invention that the marked increase in viscosity, on long term storage or on shorter term storage at elevated temperatures, is not observed.

The zinc ammonia complex test is conducted as follows:

A standard zinc ion solution is made by disolving 109.7 g of $Zn(OAc)_4.2H_2O$ (0.5 moles) in water, add 148 ml of concentrated ammonia (2.0 moles) and dilute to 1 liter. The pH of this solution is about 9.6 and the solution is a standard 0.5M $Zn(NH_3)_4++$ solution. Prepare 50 ml of a 0.1N (5meq) solution of the polymer and adjust the pH of this solution to 9.5 using 5 molar hydrochloric acid or sodium hydroxide as needed. Add 1.0 ml of concentrated ammonia to the dispersant polymer solution, then titrate with the standard zinc ammonia complex solution, observing the amount of titer needed to form a precipitate. If no precipitate is formed when 10 milliliters of the zinc ammonia solution is added, the determination is considered completed and the report of >10 milliliters indicates that the zinc ammonia complex salt of the polymer is soluble on a 1:1 molar basis. This result indicates that a paint formulated with this dispersant will not be destabilized by the dispersant.

The dispersant copolymers are usually prepared by solution polymerization techniques, preferably in water-miscible media, but bulk, emulsion or non-aqueous dispersion polymerization methods may be desired in special cases. In the usual solution polymerization, the appropriate monomeric mixture is reacted, under oxygen-free conditions, at temperatures in the range of about 30° to 150° C. and in the presence of such free radical initiators at t-butyl peroxypivalate, t-butyl peracetate, ammonium persulfate, t-butyl hydroperoxide, cumene hydroperoxide, and like free radical catalysts including free radical redox polymerization initiators. Catalyst concentrations of about 1 to 15% by weight of the monomers are useful to obtain the low molecular weight polymers desired. Sufficient alkali metal hydroxide, ammonium hydroxide, or water-soluble amine, preferably a slight excess, may be added during polymerization or subsequently to neutralize free acid groups on the copolymer, thus coverting the dispersant to the operable salt. the post-polymerization neutralization is preferred. As is well known, catalyst fragments such as derived from a persulfate may appear as part of the polymer. Other known methods of producing low molecular weight polymers may be utilized in place of or in addition to the use of a high proportion of a free radical catalyst. Examples of such other methods are the use of a high polymerization temperature, the use of a chain transfer agent, and all of these together. Among the chain transfer agents are carbon tetrabromide, allyl chloride, thio-$\beta$-naphthol, thiophenol, butylmercaptan, ethylthioglycolate, mercaptoethanol, isopropylmercaptan, and t-butylmercaptan.

Another method of preparing the copolymer of this invention is by anionic polymerization. A preferred method of anionic polymerization is carried out in the presence of an alkoxide anion which serves as an initiator and an alcohol which serves as a chain regulating agent, as taught by U.S. patent application Ser. No. 517,337, now U.S. Pat. No. 4,103,093 filed Oct. 23, 1974, herein incorporated by reference.

In addition to the dispersant copolymer, an aspect of the invention is the provision of dispersions of pigments as fluid pastes of high solids content and low aqueous medium content (said aqueous medium comprising water or water and a minor or major proportion of alkylene glycol or other water-miscible solvent) containing in admixture a relatively minor amount of the described water-soluble salt of the copolymer of ethylenically unsaturated acid as dispersant. An effective amount of the salt of the copolymer effecting dispersion of solids and fluidity of the pigment paste is employed and will usually not be over about ten percent of the weight of pigment and may be as low as about 0.01%. 0.5% to 7% is preferred and 1% to 5% is most preferred. Many pigment paste and paint recipes of the prior art are greatly improved by the substitution of above 2%, roughly 2% to 4% of the dispersant of this invention for the dispersant of the recipe.

For the preparation of these pigment pastes, it is generally most convenient to prepare an aqueous solution of dispersant copolymer in a salt form. Concentrations of 5 40% may be used, although those of 10 to 20% are usually preferred. Pigment, water or other solvent system and solutions are mixed. If desired, the paste or suspension may be ground in a mill—a pebble mill, roll mill, colloid mill, or high speed stone mill, or in some instances a high shear mixer being suitable. Sufficient copolymer is used as the sole dispersant or in admixture with other dispersants to ensure good dispersion and fluidity of the paste. The optimum amount of copolymer will depend upon the specific pigment or pigments and upon the state of subdivision thereof. In general, the finer the particle size the more dispersant should be used. Concentrated pastes can be extended to give dilute pastes, when the latter are needed. The pigment pastes are a suitable and convenient compositions for addition to aqueous resin latexes or dispersions to form emulsion paints. Moreover, fluid pastes of certain pigments have diverse uses, for example, such high solids content slurries of calcium hydroxide are useful for coatings as white-wash, field markings, or the like, or as concentrated alkaline reagents in chemical manufacturing; dispersions of crabon blacks or other pigments in aqueous media are useful in the fields of paper, cement, water-base paints, coating compositions, inks, rayons, and rubber. The pigments may be present in the foregoing pastes in an amount up to about 85% by weight of the paste.

The pigment pastes of this invention are concentrated dispersions of pigment in water, aqueous solution or water-miscible solvent. They may also contain small amounts of a water soluble binder or a binder latex. In addition to pigments, the paste may contain a dye as an added colorant. The pastes are used in the factory production of paints and as colorant additives to produce custom colors in the paint store or by the painter at the painting site. Several types of paste are used. Factory ground pastes such as the titanium dioxide based pastes used in the examples below are milled at the factory. Other pastes, such as titanium dioxide or clay, may be in the form of a slurry and delivered by tankcar. Others are aqueous colorants for use with latex paints only and generally added to custom-colored paints at the store or by the painter. A variant of these are the universal colorants which may be added to either aqueous latex paints or to oil-based paints. A common practice is to add the colorants to a special paint, called a tint base, adapted for use with colorants.

Many important properties of a paint are in large measure due to the nature of the pigment paste used in formulating the paint. Among these properties are alkali resistance, exterior durability, low toxicity and low cost for the desired level of performance. Reactive pigments are comparatively little used in latex paints because of the difficulties in obtaining long term storage stability in the presence of polyvalent metal ions. Instability on storage often shows up as an increase in viscosity of the paint sometimes to the point of gelation. One reactive pigment, zinc oxide, is also used as a secondary mildewcide as had lead containing pigments in by-gone days. Other paint properties which are influenced by the nature of the pigment, the dispersant or the grinding medium are flow, leveling, gloss, stain removal, burnish resistance, durability, chalking rate, tint retention, frothing, hiding and so forth. These properties depend on the nature of the extender pigments as well as on the prime pigments and the dispersant.

Concentration of the pigment in a paint is conventionally related to the concentration of binder, both on a volume basis. Pigment volume concentration (PVC) is the ratio of volume of pigment to the volume of total non-volatile materials (pigment and binder) in a coating. Many latex paint properties have been shown to be critically dependent on the PVC. Scrub resistance of a paint decreases with PVC, as does stain removal, however, hiding improves with higher PVC. The critical pigment volume concentration (CPVC) is the level of pigment in the dry paint having just sufficient binder to fill the voids between the pigment particles. Different types of paints differ in the desirable PVC or CPVC values. For instance, ceiling paints are not required to be very washable and can be formulated at or above the CPVC whereas exterior formulations, particularly gloss paints, are generally formulated well below the CPVC.

In milling or grinding the paste glycols are often used to replace part or all of the water used as the grinding medium. The glycols lower the evaporation rate of the water and thus reduce drying during the grinding. The glycols also contribute anti-freeze and wet edge properties to the paint, the former aiding in shipping and storage of the paint and the latter the brushing peroperties of the paint, particularly in the region of the lap or overlap of brushed portions. Wet edge time or open time is the length of time a coat of paint remains wet enough to allow "brushing in" at the laps. The amount of grinding medium used varies a great deal and is based on the final one hundred gallons of paint; typical values range from about 50 about 150 pounds.

The dispersant of the present invention protects against flocculation of the pigment, aids the tint retention and hiding of the paint, helps fluidize the pigment slurry for ease of milling or grinding and aids in the color acceptance of colorants in the paste and paint made therefrom for a very wide range of paint formulations. The use formulations include latex paints of the following types: interior and exterior flat, sheen and gloss; corrosion resistant topcats and primers; wood and alkaline surface topcoats and primers; and so forth. Pigments for the paint industry are normally supplied in fine particle sizes necessary for use in thin coating films. For use in paints these particles must be thoroughly wetted and any pigment conglomerate formed during manufacturing, shipping or storage must be broken up in a high speed disperser, sand mill or other dispersing equipment. Once a good pigment dispersion is produced in forming the pigment paste, the dispersion must be maintained in this condition if the paint formulated therefrom is to perform satisfactorily. It is commonly hypothesized that the dispersant plays a role in both aiding in the breakup of agglomerates and in stabilizing the pigment in the dispersed form. Although this invention is not bound by or related to any specific theory or mechanism of dispersant activity, the following comments are offered as an aid in teaching the invention. Although there are many uncertainties in the theory of the operation of dispersants, it is believed that the dispersant provides a layer which physically prevents contact between different pigment particles and which, by its ionization, furnishes an electrically charged envelope surrounding each pigment particle which acts to repel the like charged neighbor particles. Thus the dispersant prevents particle contact and indeed prevents the particles from getting so close together that surface attractive forces between the particles become strong enough to lead to flocculation of the particles.

In the case of many dispersants, it is important that a minimum amount be employed in the formation of the pigment paste and of the paint. Excess dispersant results in unstable dispersions and flocculation of the pigment in the paste or paint. This is believed, by some experts, to be due to the increased ionic content of the aqueouse medium and the so-called double layer effect produces a decrease in the particle separation and thus stability of the dispersion. An important feature of the dispersant of the present invention is that it may be used at high concentrations, in types of paint formulations requiring such high concentrations, without leading to flocculation of the dispersant or sensitivity of the applied coating to water or aqueous solutions. Such sensitivity is markedly reduced or absent in coatings in which the dispersant of the present invention is employed compared to prior art dispersants. The dispersants of the instant invention are advantageous in paints containing added inorganic or organic salts because of the great stability imparted by these dispersants.

A pigment paste often contains low concentration of other components, other than the pigment, the medium and the dispersant, to achieve specific effects. Wetting agents or surfactants are often used to aid in the dispersion of the pigment. The commonly used ones are anionic surfactants, such as the alkalli metal, amine or ammonium salts of alkyl, aryl, alkaryl, aralkyl sulfates, sulfonates, phosphates or phosphonates, or nonionic surfactants such as ethoxylated fatty acids, esters, alcohols, amines, amides, phenols or the corresponding sulfur-containing compounds. The anionic surfactants may also comprise ether or polyether units and the nonionic surfactants may also comprise alkoxyl units other than ethoxyl, such as propoxyl. In general, high foaming surfactants are avoided because the use of such surfactants would lead to excess foam during the milling or grinding of the paste or require a high level of defoamer to be added to the paste formulation. High levels of defoamer are to be avoided, however, because these often lead to color acceptance problems. In general the surfactants aid in obtaining full color development from the pigment. Common use levels for the defoamer are 1 to 4 pounds per 100 gallons of the final paint formulation. Although there is great variability in formulating for different types of paint, a rough rule of thumb is to add half of the defoamer in the pigment paste and the other half in the let down when manufacturing the paint from the pigment paste. Thickeners are used to increase the viscosity or modify the flow or reheology of the paint made from the pigment paste. Examples of the rehology modification desired are:

1. To increase drag for improved film build;
2. To impart thixotrophy for improved pigment suspension stability;
3. To reduce dripping from the brush or roller;
4. To reduce spattering during the roller application (poorly selected thickeners can cause increased spattering).

Among the typical thickeners are hydroxyethyl cellulose, polyacrylic acid, and Attapulgite clay. These are generally used as 2 to 4% aqueous solutions when added to the pigment paste mix or to the paint.

In testing dispersant polymers, to determine their suitability for a wide range of paint formulations, corrosion resistant paint formulations are very useful for screening purposes. A paint formulated with reactive pigment such as zinc oxide and lead silicochromate offer problems to the paint formulator. One particular problem is that at high pH in the presence of ammonia, some of the zinc oxide dissolves to furnish multivalent cations. These multivalent cations can act as precipitants for dispersant polymers. Any dispersant precipitated, of course, is no longer active as a dispersant and indeed the precipitated gel may serve as a focal point for agglomeration of pigment or binder latex in a formulated paint. Thus viscosity stability determinations on aged and heat aged paints are sensitive measures of the suitablility of a dispersant insofar as its capability of imparting stability to the paint is concerned. When the corrosion resistant paint is applied to a ferrous surface and tested for the corrosion resistance imparted to the surface, the paint undergoes one of the most searching tests avaiable. Only a tough, well integrated, pore-free, impervious coating will pass the battery of corrosion resistance tests. Any dispersant polymer which detracts from these properties is, of course, also unsuited for use in some of the other paint formulations. A dispersant which performs well in a model corrosion-resistant paint formulation will also perform well in a wide range of paint formulations.

The following examples further illustrate the invention, but are not intended to limit it in any way the invention being defined only by the claims. Unless otherwise noted, all parts are by weight and all temperatures are in degrees Centrigrade. The first group of examples hereinbelow teach the polymerization processes and compositions of dispersant polymers. The later examples teach the preparation of pigment pastes and of paints made therefrom and the testing of these paints when used as coatings, thereby illustrating particular unique features of the dispersant polymers of this invention. Abbreviations used in the examples include BMA for n-butyl methacrylate, MAA for methacrylic acid, MMA for methyl methacrylate, LMA for lauryl methacrylate, PG for propylene glycol, $\overline{M}n$ for number average molecular weight and $\overline{M}w$ for weight average molecular weight.

EXAMPLES 1–3

AMMONIUM SALTS OF BMA/MAA COPOLYMERS VIA FREE RADICAL INITIATION

To prepare the polymer of Example 1 (BMA/MAA = 62/38 by weight), a 2-liter, four-necked, round bottomed flask equipped with a mechanical stirrer, a nitrogen ebullator, a thermometer, a condenser, two Claisen adapters, two addition funnels, and a heating mantle atop a thermosensor controlled pot-lifter is charged with 430 g of isopropanol. Dry nitrogen ebullition is begun and the solvent heated to reflux. A monomer mixture made up of 177.5 g (1.25 mole) of BMA and 107.5 g (1.25 mole) of MAA is charged over one hour; simultaneously, an initiation solution made up of 17.07 g of 75% t-butylperoxypivalate in mineral spirits in 100 g of isopropanol is charged. The reaction mixture gradually thickens. After completion of the additions, the mixture is maintained at reflux for an additional hour and then cooled.

A portion (300 g) of the polymer is charged to a 1-liter, four-necked, round bottomed flask fitted with a mechanical stirrer, a nitrogen inlet, a distillation head atop a foam trap, a thermometer, a heating mantle atop a controlled pot-lifter, two addition funnels and two Claisen adapters. The pot contents are heated until distillation begins. Water and 28% aqueous ammonium hydroxide are charged to separate addition funnels. Water is added and a distillate made up of the water-isopropanol azeotrope is obtained (some ammonia is also lost during this solvent exchange); aqueous ammonium hydroxide solution being added at a rate such that homogeneity is maintained. Water addition and distillation are continued until the distillate temperature reaches 100° C. indicating depletion of isopropanol from the product. The solution is cooled and the pH is adjusted to 9.7 by addition of more aqueous ammonium hydroxide. Solids (150° C./1 hr.) are measured then adjusted to 25% by addition of water. Brookfield viscosity (Brookfield Synchro-Lectric Viscometer LV1) is 3600 cps and the pKa is 7.0. $\overline{M}n$ is 5,000 and $\overline{M}w$ is 14,000 for the acid form of the polymer.

Example 2 is prepared by the procedure of Example 1 but changing the weight ratios to 30% BMA, 70% MAA. For Example 3, the weight ratios are 77% BMA, 23% MAA.

EXAMPLES 4 and 5

POLYMERS PREPARED BY SAPONIFICATION OF ANIONICALLY INITIATED POLYMERIZATIONS

To prepare the polymer of Example 4, BMA/MAA about 70/30 by weight, the procedure of Example 1, Method C of U.S. patent application, now U.S. Pat. No. 4,103,093 Ser. No. 517,337, filed on Oct. 23, 1974 for "Novel Methacrylic Polymers Having Condensation Crosslinkable Functionality", herein incorporated by reference, is used. The procedure, as given on pages 32-34 of said application, is employed with n-butyl methacrylate in place of the methyl methacrylate used in the referenced Example 1. The reaction temperature is 80° C., the conversion is 99% after four hours of reaction using about 1.0 to 1.5 mole percent of potassium methoxide catalyst and 15 mole percent n-butanol, based on the n-butyl methacrylate. The product has a weight average molecular weight about 1,000 with more than 90% by weight being between 350 and 2,200 in molecular weight. The polymer, at about 85-90% solids in toluene, is treated with 50 equivalents percent (based on total ester equivalents) of potassium hydroxide (50%) at 60° C. The heterogeneous mixture is stirred at full reflux (85°-105° C.) for 1-2 hours until exotherm is established and the pellets dissolve and react. After two additional hours at reflux, conversion to carboxylate reaches 94% of potassium hydroxide (about 3.0-3.3) carboxylate functionality ). The crude potassium salt is treated with 105 equivalent % of concentrated sulfuric acid at 45° to 65° C. and a suitable solvent to retain solubility of the organic acid (ketones, ester solvents, etc.). The sulfate salt is removed by centrifugation or repeated water washes. The organic layer is vacuum azeotropically dried at 70° to 80° C. and filtered free of residual insoluble inorganic sulfate salts, providing a clear, pale-yellow liquid of 35,000 cps viscosity at 70% solids in toluene/n-butanol/25° C. Acid number (100% solids) is 200.

The polymer of Example 5 is the polymer of Example 4 converted to the ammonium salt by dilution to ca. 20% solids by a mixture of 7 parts water, 2 parts toluene and 1 part isobutanol. Sulfuric acid (97%) is added carefully over a 15 minute period, with cooling, until about 10% excess over the charged caustic is present. The white, mobile, two phase mixture is agitated for 15-20 minutes, the aqueous layer removed and replaced by an equal amount of fresh water. The mixture is heated to 60°-70° C. under vacuum, the toluene removed as distillate, the pressure raised to one atmosphere and the temperature to 100° C. until the total distillate is about ⅓ greater than the charged toluene and isobutanol. The temperature is allowed to fall to 90° C. and aqua ammonia is added until the white, two phase soft gum is dissolved. The solution is cooled to 60°-65° C. and about half as much ammonia is added bringing the pH to about 9.5.

EXAMPLES 6-14

OTHER FREE RADICAL INITIATED ACRYLIC COPOLYMER

In these examples, the procedure of Example 1 is used to make the polymer. The polymers are then converted to the sodium salt form, rather than the ammonium salt form as in Example 1, by utilizing 50% aqueous sodium hydroxide in place of the 28% aqueous ammonium hydroxide recited in Example 1. The compositions are (by weight percent):

Example 6: MMA/MAA=46/54
Example 7: MMA/MAA=62/38
Example 8: MMA/MAA=70/30
Example 9: BMA/MAA=40/60
Example 10: BMA/MAA=50/50
Example 11: BMA/MAA=55/45
Example 12: BMA/MAA=65/35
Example 13: LMA/MAA=62/38
Example 14: LMA/MAA=35/65

EXAMPLE 15

FREE RADICAL INITIATED STYRENE-METHACRYLIC ACID COPOLYMER

The sodium salt of a 45% styrene, 55% methacrylic acid copolymer is prepared as follows:

| Reagents: | | | |
|---|---|---|---|
| Propylene glycol (PG) | 300.0 | g | |
| Styrene | 135.0 | g | (1.30 moles) |
| Methacrylic acid | 165.0 | g | (1.92 moles) |
| Mercaptoethanol | 3.0 | g | |
| 70% t-Butyl peracetate in mineral spirits | 9.0 | g | |
| | 0.9 | g | |

A 1-liter, four-necked, round bottomed flask equipped with a mechanical stirrer, two addition funnels, a distillation head with a variable takeoff, a thermometer, a nitrogen inlet, and a heating mantle atop a thermosensor-controlled pot lifter is charged with 300 g of propylene glycol. This heel charge is heated to 150° C. under nitrogen. The monomer charge (135 g styrene, 165 g methacrylic acid, and 3 g mercaptoethanol) is gradually charged over 5 hours. Simultaneously, the initiator solution (9.0 g of 70% t-butyl peracetate) is added over the same period. After completion of the feeds, an additional 0.9 g of t-butyl peracetate solution is added and the batch held at150° C. for another hour.

Vacuum (finally to 25 mm) is applied to distill 130 g of propylene glycol containing unreacted methacrylic acid and styrene.

The copolymer solution is cooled and neutralized with 286 g of 25% aqueous sodium hydroxide solution to give a final product pH of 10.1; theoretical solids=49.1%, theoretical PG content=22.5%, viscosity 7650 cps.

EXAMPLE 16

FREE RADICAL BMA/MAA COPOLYMER

The sodium salt of BMA/MAA=62/38, by weight, is prepared by a modification of the procedure of Example 15. Using the same equipment, the polymerization is carried out with the following materials.

| Materials | Grams/1,000 grams product |
|---|---|
| 1. Propylene glycol | 261.3 |
| 2. n-butyl methacrylate | 237.8 |
| 3. Methacrylic acid | 145.8 |
| 4. Mercaptoethanol | 3.8 |
| 5. t-butyl hydroperoxide (70% aqueous) | 17.0 |
| 6. t-butyl hydroperoxide (70% aqueous)-chaser | 1.7 |
| 7. Ammonium hydroxide (aqua ammonia) | 102.9 |

| Materials | Grams/1,000 grams product |
|---|---|
| 8. Water | 229.8 grams* |

*plus the weight of the distillate removed during the polymerization.

A nitrogen blanket and a temperature of 150° C. is maintained throughout the polymerization. The flask is charged with 90% of the propylene glycol and is heated to 150° C. Materials 2, 3 and 4 are mixed and fed concurrently with a mixture of 5 and the remainder of 1 over a period of five hours. Toward the end of the polymerization, some distillate is removed to maintain the 150° C. pot temperature. Upon completion of the feed, the flask is held at 150° C. for a period of 15 to 30 minutes then the chaser, material 6, is added. Following a one-hour hold at 150° C., the product is cooled to 75° to 80° C. and materials 7 and 8 are added. The final product is a slightly hazy, yellowish liquid at about 40% solids in a propylene glycol/water solution (approximately 40% propylene glycol). The viscosity is about 4,200 centipoises measured at 25° C. and the pH about 9.5. The number average molecular weight is 2,470 and the weight average molecular weight is 6,670, for the polymer in the acid form; number average molecular weight being determined by vapor phase osmometry and weight average calculated from the number average and the polydispersity, 2.7, estimated from the molecular weight distribution determined via gel permeation chromotography.

In an alternative process, material 4, the mercaptoethanol, is mixed with the propylene glycol in the kettle charge rather than with the monomers of the continuous feed. The product made this way has the same appearance and solids. Its viscosity is 3,700 centipoises at 25° C. and pH 9.8.

EXAMPLE 17

PRIOR ART DISPERSANTS (A) Sodium salt of p-MAA ($\overline{M}n$ ca. 4000–5000), 30% solids (B) Sodium salt of diisobutylene/maleic anhydride copolymer, 25% solids (C) Ammonium salt of half amide of diisobutylene/maleic anhydride (21%)

(D) Sodium salt of acrylic copolymer comprising carboxylate mers. 40% solids, Dispex G-40, Allied Colloids (E) Sodium salt of polycarboxylic acid, 25% solids, Colloid 111, Colloids Inc.

(F) Ammonium salt of polycarboxylic acid, 25% solids, Colloids 111M, Colloids Inc.

(G) Organic Phosphate, 90% solids, Strodex PK-90, Dexter Chemical (H) Ammonium salt of styrene/maleic ester copolymer, 35% solids SMA 144OH (Arco Chemical)

(I) Ammonium salt of p-MAA, Example 17A above, 25% solids

EXAMPLE 18

CORROSION INHIBITING PAINTS UTILIZING PRIOR ART DISPERSANTS

The following are charged to a suitable vessel (steel beaker) and ground in a high speed dispersing mill, here a Cowles dissolver at about 4,000 feet per minute for 15 minutes, to give a pigment paste having 0.56% dispersant on pigment, by weight:

| Grind | Pounds/100 gal. |
|---|---|
| Water | 60.0 |
| Dispersant (solids basis) | 2.5 |
| Water | 6.4 |
| Octyl phenyl poly(16)oxyethylene benzyl ether (wetting agent) | 2.2 |
| Nopco NXZ (Nopco) (antifoamer) | 2.2 |
| Ethylene glycol | 22.0 |
| Hydroxyethyl cellulose, Natrosol 250 MR (Hercules) 2½%) (thickener) | 65.6 |
| Rutile titanium dioxide, TiPure R-966 (duPont) | 209.4 |
| 325 mesh water-ground mica (English Mica) | 26.0 |
| Whiting, calcium carbonate, Suspenso (Diamond Alkali) | 125.0 |
| Zinc oxide, Kadox 15 | 6.0 |
| Basic lead silico chromate, Oncor M-50 (National Lead) | 80.0 |

The above is then let down at a lower speed with the following:

| Letdown | Pounds/100 gal. |
|---|---|
| Ammonium carbonate | 15.0 |
| An acrylic latex at about 46% solids containing about ⅔ ethyl acrylate, about 1% methacrylic acid, about 2% of a polar-group-containing monomer as described in U.S. Pat. No. 3,356,627 and the remainder methyl methacrylate (pre-mix) | 600.9 |
| 2,2,4-trimethylpentanediol-1,3-monoisobutyrate | 5.0 |
| 2-n-octyl-4'-isothiazolin-3-one; 45% active (mildewcide) (pre-mix) | 2.0 |
| Nopco NXZ (Nopco) (antifoamer) | 2.2 |

The pH is adjusted to 9.6 using aqua ammonia.

After equilibration at room temperature for seven days, the paints are brush applied to clean cold rolled steel to yield a 2 mil dry film thickness in two coats. The second coat is applied 18 hours after the first. The panels are allowed to dry one week at ambient conditions and then subjected to salt spray and water fog corrosion resistance tests for 500 hours (ASTM-B-117 and D-1735). Performance is rated in terms of degree of undercoat rusting and blistering of the coating (ASTM D-772). Both low shear Stormer viscosity and high shear ICI brushing viscosity of the paints are measured initially, and after 250 hours storage at room temperature and at 140° F. The Stormer viscosity is reported in Krebs Unit and is measured by the method of ASTM D562-55 (reapproved 1972). The ICI viscosity is reported in poise and is measured by the ICI cone and plate viscometer of Research Equipment (London) Ltd.

| Paint | 18A | 18B | 18C | 18D | 18E | 18F | 18G | 18H |
| Dispersant | Ex.17A | Ex.17B | Ex.17D | Ex.17H | Ex.17C | EX.17G | Ex.17E | Ex.17F |
|---|---|---|---|---|---|---|---|---|
| Dispersant Level (lb/100 gal) | 2.5 | 2.5 | 2.5 | 2.5 | 2.5 | 2.5 | 2.5 | 2.5 |
| Dispersant pKa | 5.9 | 4.0/9.8 | 4.8 | 6.5 | 6.5 | — | — | — |
| Zinc ammonia complex test | >10.0 | 5.5 | >10.0 | <1.5 | >10.0 | — | — | — |
| Stormer Viscosity (Krebs Units) | | | | | | | | |
| initial | 70 | 68 | 70 | 70 | 70 | 74 | 72 | 72 |
| 250 hours at 77° F. (unsheared) | 82 | 77 | 81 | 81 | 82 | 88 | 76 | 76 |
| (sheared) | 78 | 76 | 78 | 78 | 80 | 83 | 74 | 76 |
| 250 hours at 140° F. (unsheared) | 89 | 104 | 95 | 100 | 108 | 104 | 104 | 122 |
| (sheared) | 82 | 85 | 82 | 88 | 85 | 89 | 89 | 89 |
| High Shear Viscosity (ICI poise) | | | | | | | | |
| 250 hours at 77° F. | 0.5 | 0.5 | 0.5 | 0.5 | 0.5 | 0.5 | 0.5 | 0.4 |
| 250 hours at 140° F. | 0.7 | 0.9 | 0.5 | 1.0 | 1.0 | 0.9 | 1.0 | 1.1 |
| Corrosion Resistance | | | | | | | | |
| 500 hours salt spray | | | | | | | | |
| undercoat rusting | moderate | none | slight | none | none | none | none | none |
| blister (size) | 7 | — | 8 | — | — | — | — | — |
| blister (density) | dense | none | sight | none | none | none | none | none |
| 500 hours high humidity | | | | | | | | |
| undercoat rusting | slight | none | heavy | sl-med | slight | trace | slight | moderate |
| blister (size) | 7 | — | 7 | 7 | 9 | 9 | 8 | 8 |
| blister (density) | medium | none | sl-med | sl-med | slight | trace | slight | moderate |

The performance of the prior art dispersants as indicated by the data in Table 11, can be separated into two categories.

(1) Dispersants with good maintenance (500 hour salt spray) but poor viscosity stability (particularly unsheared heat-aged vs. unsheared room temperature aged Stormer viscosity and high shear viscosity) as exemplified by paints in the Example 18 series (BDEFGH).

(2) Other dispersants had poor maintenance (corrosion resistance) properties but acceptable viscosity stability; these are exemplified by paints 18A and 18C.

EXAMPLE 19

PAINTS PREPARED WITH THE DISPERSANTS OF EXAMPLES 1, 2, 3, 9, 10 AND THE PRIOR ART

The paints were prepared and evaluated by the methods given in Example 18. The results are in the following table. Examples 19A and 19H (dispersants of examples 17B and 3) have limited storage stability as evidenced by the increasing viscosity of the paint stored, particularly stored at an elevated temperature. Examples 19B, 19C and 19E (dispersants of examples 17A, 17I and 2) exhibit greater corrosion than the others as indicated by the salt spray test.

| Paint | 19A | 19B | 19C | 19D | 19E | 19F | 19G | 19H |
| Dispersant | Ex. 17B | Ex. 17A | Ex. 17I | Ex. 9 | Ex. 2 | Ex. 10 | Ex. 1 | Ex. 3 |
|---|---|---|---|---|---|---|---|---|
| Dispersant Level (lb/100 gal) | 2.5 | 2.5 | 2.5 | 2.5 | 2.5 | 2.5 | 2.5 | 2.5 |
| Dispersant pKa | 4.0/9.8 | 5.9 | 5.9 | 6.5 | 6.1 | 6.4 | 7.0 | 7.3 |
| Zinc ammonia complex test | 5.5 | >10.0 | >10.0 | >10.0 | >10.0 | >10.0 | >10.0 | <1.5 |
| Stormer Viscosity (Krebs Units) | | | | | | | | |
| initial | 72 | 72 | 72 | 72 | 72 | 72 | 72 | 74 |
| 250 hours at 77° F. (unsheared) | 77 | 77 | 79 | 78 | 77 | 78 | 83 | 95 |
| (sheared) | 74 | 77 | 77 | 76 | 77 | 74 | 77 | 86 |
| 250 hours at 140° F. (unsheared) | 122 | 89 | 85 | 85 | 82 | 100 | 100 | >140 |
| (sheared) | 97 | 82 | 79 | 78 | 75 | 82 | 80 | 98 |
| High Shear Viscosity (ICI poise) | | | | | | | | |
| 250 hours at 77° F. | 0.5 | 0.6 | 0.5 | 0.5 | 0.5 | 0.5 | 0.6 | 0.7 |
| 140° F. | 1.2 | 0.5 | 0.6 | 0.5 | 0.5 | 0.6 | 0.7 | 1.5 |
| Corrosion Resistance | | | | | | | | |
| 500 hours salt spray | | | | | | | | |
| undercoat rusting | none | med.dense | dense | med. | med.dense | trace | trace | none |
| blister (size) | — | 7 | 8 | 7 | 8 | 9 | — | — |
| blister (density) | none | med.dense | dense | med. | med.dense | trace | none | trace |
| 500 hours high humidity | | | | | | | | |
| undercoat rusting | med.dense | slight | slight | none | med.dense | slight | slight | med. |
| blister (size) | 8 | 7 | 7 | 9 | 8 | 8 | 8 | 9 |
| blister (density) | med.dense | slight | slight | slight | med.dense | slight | med.dense | med. |

EXAMPLE 20

DRYING OIL MODIFIED CORROSION INHIBITING PAINTS USING THE DISPERSANTS OF EXAMPLES 4 and 5

Drying oils are frequently added to latex maintenance paints for increased protection of ferrous surfaces that have already rusted. It is especially difficult to achieve paint stability in this type of system so the effectiveness of the dispersant is particularly important.

Oil modified latex paints having the following ingredients are prepared and evaluated, according to the procedures described in Example 18, using the following formulation.

| Grind | Pounds/100 gal. |
|---|---|
| Water | 44.4 |
| Dispersant (dry basis) | variable, indicated in the table below |

-continued

| Grind | Pounds/100 gal. |
|---|---|
| Octyl phenyl poly(16)oxyethylene benzyl ether (wetting agent) | 2.2 |
| Nopco NXZ (Nopco) (antifoamer) | 2.2 |
| Ethylene glycol | 22.0 |
| Hydroxyethyl cellulose, Natrosol 250 MR (Hercules) (2½ %) (thickener) | 65.6 |
| Rutile titanium dioxide, TiPure R-966 (duPont) | 209.4 |
| 325 mesh water-ground mica (English Mica) | 26.0 |
| Whiting, calcium carbonate, Suspenso (Diamond Alkali) | 125.0 |
| Zinc oxide, Kadox 15 | 6.0 |
| Basic lead silico chromate, Oncor M-50 (National Lead) | 80.0 |
| Ammonium carbonate | 12.0 |
| An acrylic latex at about 46% solids containing about ⅔ ethyl acrylate, ⅓ methyl methacrylate and about 1% methacrylic acid } pre-mix | 480.0 |

| Tung Oil | 44.2 |
|---|---|
| Octyl phenyl poly(8.7)ethoxy-ethanol | 3.14 |
| Octyl phenyl poly(39)ethoxy-ethanol | 1.73 |
| 2,2,4-trimethylpentanediol-1,3-monoisobutyrate | 4.0 |
| Nopco NXZ (Nopco) (antifoamer) } pre-mix | 2.0 |
| 2-n-octyl-4'-isothiazolin-3-one 45% active | 2.0 |
| 6% Co Naphthenate | 0.21 |
| 6% Zr Octoate | 3.52 |

-continued

| Grind | Pounds/100 gal. |
|---|---|
| Water | 29.30 |
| Hydroxyethyl cellulose, Natrosol 250 MR (Hercules) (2½ %) (thickener) | 29.30 |

The pH is adjusted to 9.6 with ammonia.

The results of the heat stability and corrosion resistance tests are given in the following table. Even at low use levels, the conventional polyacrylate dispersant has poor salt spray resistance (Paint 20A). At the same low use level, the olefin/maleic anhydride dispersant confers excellent corrosion resistance but stability is unacceptable (Paint 20B). At higher use levels stability is somewhat improved but corrosion resistance is sacrificed (Paint 20C). On the other hand, comparably high levels of the dispersants of Examples 4 and 5 not only confer excellent stability, but corrosion resistance is also preserved (Paints 20D and 20E).

| Paint<br>Dispersant | 20A<br>Ex.17A | 20B<br>Ex.17B | 20C<br>Ex.17B | 20D<br>Ex.4 | 20E<br>Ex.5 |
|---|---|---|---|---|---|
| Dispersant Level (lb/100 gal) | 2.5 | 2.5 | 10.0 | 10.0 | 10.0 |
| Dispersant pKa | 5.9 | 4.0,9.8 | 4.0,9.8 | 6.9 | 6.9 |
| Zinc ammonia complex test | >10.0 | 5.5 | 5.5 | >10.0 | >10.0 |
| Stormer Viscosity (Krebs Units) | | | | | |
| initial | 72 | 72 | 72 | 77 | 77 |
| 250 hours at 77° F. (unsheared) | 82 | 77 | 80 | 82 | 77 |
| (sheared) | 77 | 75 | 77 | 77 | 77 |
| 250 hours at 140° F. (unsheared) | 86 | 104 | 95 | 89 | 89 |
| (sheared) | 82 | 89 | 86 | 82 | 82 |
| High Shear Viscosity | | | | | |
| 250 hours at 77° F. | 0.6 | 0.5 | 0.6 | 0.6 | 0.6 |
| 250 hours at 140° F. | 0.7 | 1.4 | 0.6 | 0.6 | 0.6 |
| Corrosion Resistance | | | | | |
| 500 hours salt spray | | | | | |
| undercoat rusting | medium | none | medium | none | none |
| blister (size) | 8 | — | 8 | — | — |
| blister (density) | medium | none | medium | none | none |
| 500 hours high humidity | | | | | |
| undercoat rusting | slight | slight | medium | trace | sl-med |
| blister (size) | 9 | 7 | 4 | 7 | 7 |
| blister (density) | slight | slight | medium | med.dense | sl-med |

EXAMPLE 21

PAINTS FORMULATED WITH THE DISPERSANTS OF EXAMPLES 11, 12 AND THOSE OF THE PRIOR ART

Paints are prepared and evaluated using the procedures of Example 18 except that the amount of zinc oxide in the formulation is increased to 9 pounds per 100 gallons from the usual 6 pounds per 100 gallons. At the higher zinc oxide levels, it is seen that the paints are more unstable when the prior art dispersants are used than when the dispersants of this invention are used.

| Paint<br>Dispersant | 21A<br>Ex.17B | 21B<br>Ex.17A | 21C<br>Ex.11 | 21D<br>Ex.12 |
|---|---|---|---|---|
| Dispersant Level (lb/100 gal) | 5.0 | 2.5 | 5.0 | 5.0 |
| Dispersant pKa | 4.0,9.8 | 5.9 | 6.4 | 6.8 |
| Zinc ammonia complex test | 5.5 | >10.0 | >10.0 | >10.0 |
| Stormer Viscosity (Krebs Units) | | | | |
| initial | 72 | 72 | 72 | 72 |
| 250 hours at 77° F. (unsheared) | 77 | 82 | 77 | 74 |
| (sheared) | 72 | 79 | 75 | 74 |
| 250 hours at 140° F. (unsheared) | 138 | 95 | 89 | 89 |
| (sheared) | 95 | 86 | 80 | 80 |

-continued

| Paint<br>Dispersant | 21A<br>Ex.17B | 21B<br>Ex.17A | 21C<br>Ex.11 | 21D<br>Ex.12 |
| --- | --- | --- | --- | --- |
| High Shear Viscosity (ICI poise) | | | | |
| 250 hours at 77° F. | 0.5 | 0.5 | 0.5 | 0.5 |
| 140° F. | 1.2 | 1.0 | 0.7 | 0.7 |
| Corrosion Resistance | | | | |
| 500 hours salt spray | | | | |
| undercoat rusting | light | mod-dense | mod-dense | moderate |
| blister (size) | 8 | 6 | 7 | 8 |
| blister (density) | light | mod-dense | mod-dense | moderate |
| 500 hours high humidity | | | | |
| undercoat rusting | none | slight | trace | slight |
| blister (size) | — | 7 | 9 | 9 |
| blister (density) | none | slight | trace | slight |

EXAMPLE 22

PAINTS FORMULATED WITH THE DISPERSANTS OF EXAMPLES 6, 7, 8 AND THOSE OF THE PRIOR ART

Paints are prepared and evaluated using the procedures of Example 18. The results are given in the following table. The viscosity stability and maintenance properties are to be carefully compared to the dispersant pKa and the solubilities of the zinc complex.

| Paint<br>Dispersant | 22A<br>Ex.17A | 22B<br>Ex.17B | 22C<br>Ex.6 | 22D<br>Ex.7 | 22E<br>Ex.8 |
| --- | --- | --- | --- | --- | --- |
| Dispersant Level (lb/100 gal) | 2.5 | 2.5 | 2.5 | 2.5 | 2.5 |
| Dispersant pKa | 5.9 | 4.0,9.8 | 5.9 | 6.0 | 6.2 |
| Zinc ammonia complex test | >10.0 | 5.5 | >10.0 | >10.0 | >10.0 |
| Stormer Viscosity (Krebs Units) | | | | | |
| initial | 70 | 70 | 76 | 76 | 76 |
| 250 hours at 77° F. (unsheared) | 77 | 72 | 82 | 86 | 88 |
| (sheared) | 74 | 72 | 77 | 82 | 82 |
| 250 hours at 140° F. (unsheared) | 77 | 86 | 89 | 95 | 94 |
| (sheared) | 74 | 77 | 80 | 86 | 86 |
| High Shear Viscosity (ICI poise) | | | | | |
| 250 hours at 77° F. | 0.4 | 0.5 | 0.5 | 0.5 | 0.5 |
| 140° F. | 0.4 | 0.6 | 0.5 | 0.7 | 0.8 |
| Corrosion Resistance | | | | | |
| 500 hours salt spray | | | | | |
| undercoat rusting | med-dense | none | med-dense | med-dense | sl-med |
| blister (size) | 8 | — | 8 | 8 | 8 |
| blister (density) | med-dense | none | med-dense | med-dense | sl-med |
| 500 hours high humidity | | | | | |
| undercoat rusting | trace | slight | slight | none | none |
| blister (size) | 6 | 9 | 9 | — | — |
| blister (density) | trace | slight | slight | none | none |

EXAMPLE 23

DRYING OIL MODIFIED PAINT PREPARED WITH THE DISPERSANTS OF EXAMPLES 15, 16 and 16 AND THE PRIOR ART Using the oil modified formulation of Example 20 and the procedures of Example 18, paints were made and evaluated. The results are in the table below. Even at high use level the dispersants of Examples 15 and 16 produced paints of good stability.

| Paint<br>Dispersant | 23A<br>Ex.17A | 23B<br>Ex.17B | 23C<br>Ex.15 | 23D<br>Ex.16 |
| --- | --- | --- | --- | --- |
| Dispersant Level (lb/100 gal) | 2.5 | 2.5 | 8.3 | 8.3 |
| Dispersant pKa | 5.9 | 4.0,9.8 | 7.0 | 6.9 |
| Zinc ammonia complex test | >10.0 | 5.5 | — | — |
| Stormer Viscosity (Krebs Units) | | | | |
| initial | 76 | 76 | 74 | 74 |
| 250 hours at 77° F. | | | | |
| (unsheared) | 81 | 80 | 76 | 78 |
| (sheared) | 76 | 78 | 74 | 76 |
| 250 hours at 140° F. | | | | |
| (unsheared) | 85 | >141 | 79 | 85 |
| (sheared) | 77 | >141 | 74 | 77 |
| High Shear Viscosity (poise) | | | | |
| 250 hours at 77° F. | 0.5 | 0.5 | 0.4 | 0.4 |
| 140° F. | 0.5 | — | 0.4 | 0.5 |
| Corrosion Resistance | | | | |
| 500 hours salt spray | | | | |
| undercoat rusting | moderate | none | none | none |
| blister (size) | 5 | — | — | — |
| blister (density) | moderate | none | none | none |

We claim:

1. A pigment paste, adapted for use in a wide variety of aqueous latex paints, comprising a water-compatible suspension of a finely divided pigment and, for dispersion thereof, an effective amount of a water soluble dispersant comprising (1) an addition copolymer of greater than about 30 % by weight of an α; β-unsaturated monovinylidene carboxylic acid or a mixture of such acids and (2) at least one other ethylenically unsaturated monomer, the copolymer having an apparent pKa between 6.0 and 7.5 and a number average molecular weight between about 500 and about 15,000;

the copolymer being characterized by forming a water soluble salt with a zinc ammonia complex ion at a pH of 9.6.

2. The paste of claim 1 in which the number average molecular weight of the copolymer is between 1,000 and 6,000, the apparent pKa is between 6.3 and 7.2 and the amount of the copolymer is 0.01% to 10% on the weight of the pigment.

3. The paste of claim 2 in which the copolymer is a copolymer of 30 to 70% by weight of the carboxylic acid and at least 30% by weight of a hydrocarbon monomer, a $C_1$–$C_{18}$ ester of acrylic acid, a $C_1$–$C_{18}$ ester of methacrylic acid or a mixture thereof.

4. The paste of claim 3 wherein the pKa is between 6.5 and 7.0, the number average molecular weight is between 2,000 and 4,000 and the copolymer is a copolymer of 30 to 50% by weight of acrylic, methacrylic or itaconic acids or a mixture thereof.

5. The paste of claim 4 wherein the copolymer is 0.5% to 7% by weight of the pigment and comprises 50 to 70% by weight of $C_1$–$C_8$ alkyl methacrylate mer units, $C_1$–$C_8$ alkyl acrylate mer units or a mixture thereof and wherein the pigment comprises a multivalent metal compound.

6. The paste of claim 5 wherein the copolymer is 1% to 5% of the weight of the pigment and comprises 35 to 40% by weight methacrylic acid mer units and 60 to 65% by weight of $C_2$–$C_4$ alkyl methacrylate mer units, $C_2$–$C_4$ alkyl acrylate mer units or a mixture thereof and wherein the metal compound is zinc oxide.

7. A process for preparing a pigment paste comprising adding to a vessel paste components comprising (A) water, (B) a pigment, (C) about 0.01% to about 10%, on the weight of the pigment, of a water soluble dispersant comprising (1) an addition copolymer of greater than about 30% by weight of an α, β-unsaturated monovinylidene carboxylic acid or a mixture of such acids and (2) at least one other ethylenically unsaturated monomer, the copolymer having an apparent pKa between 6.0 and 7.5 and a number average molecular weight between about 500 and about 15,000; the copolymer being characterized by forming a water soluble salt with a zinc ammonia complex ion at a pH 9.6; and, optionally, (D) a wetting agent, an antifoam agent, a solvent, a thickener or any combination thereof and grinding the components under high shear to form a paste.

8. The paste prepared by the process of claim 7.

9. A water-soluble dispersant copolymer, adapted for use in pigment paste, consisting of (1) at least about 30% by weight of an α,β-unsaturated monovinylidene carboxylic acid or a mixture of such acids and (2) at least one other ethylenically unsaturated monomer, the copolymer having an apparent pKa between 6.0 and 7.5 and a number average molecular weight between about 500 and about 15,000; the copolymer being characterized by forming a water-soluble salt with a zinc ammonia complex ion at a pH of 9.6.

10. The copolymer of claim 9 in which the number average molecular weight is between 1,000 and 6,000 and the apparent pKa is between 6.3 and 7.2.

11. The copolymer of claim 10 comprising 25 to 70% by weight of α,β-unsaturated monovinylidene carboxylic acid mer units and at least 30% by weight of mer units derived from a hydrocarbon monomer, a $C_1$–$C_{18}$ ester of acrylic acid, a $C_1$–$C_{18}$ ester of methacrylic acid or a mixture thereof.

12. The copolymer of claim 11 having a pKa between 6.5 and 7.0, a number average molecular weight between 2,000 and 4,000 and being a copolymer of 30 to 50% by weight of acrylic, methacrylic or itaconic acids or a mixture thereof.

13. The copolymer of claim 12 wherein the copolymer is 0.5% to 7% by weight of the pigment and is a copolymer of 50 to 70% by weight of $C_1$–$C_8$ alkyl methacrylate mer units, $C_1$–$C_8$ alkyl acrylate mer units or a mixture thereof.

14. The copolymer of claim 13 wherein the copolymer is 1% to 5% of the weight of the pigment and comprises 35 to 40% by weight methacrylic acid mer units and 60 to 65% by weight of $C_2$–$C_4$ alkyl methacrylate mer units, $C_2$–$C_4$ alkyl acrylate mer units or a mixture thereof.

* * * * *